(12) United States Patent
Smith et al.

(10) Patent No.: US 6,687,080 B2
(45) Date of Patent: Feb. 3, 2004

(54) METHOD AND APPARATUS FOR IMPROVED PES DEMODULATION IN THE PRESENCE OF THERMAL ASPERITIES

(75) Inventors: Gordon James Smith, Rochester, MN (US); Hal Hjalmer Ottesen, Rochester, MN (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 358 days.

(21) Appl. No.: 09/867,230

(22) Filed: May 29, 2001

(65) Prior Publication Data

US 2003/0026035 A1 Feb. 6, 2003

(51) Int. Cl.[7] ............................................... G11B 5/596
(52) U.S. Cl. .................................................. 360/77.08
(58) Field of Search .......................... 360/77.08, 77.02, 360/77.01

(56) References Cited

U.S. PATENT DOCUMENTS

| | | | | |
|---|---|---|---|---|
| 5,301,072 A | * | 4/1994 | Wilson ..................... | 360/77.01 |
| 5,602,692 A | * | 2/1997 | Freitas et al. ............ | 360/77.08 |
| 5,625,508 A | * | 4/1997 | Brown et al. ............. | 360/77.02 |
| 5,774,298 A | * | 6/1998 | Cheung et al. ........... | 360/77.08 |
| 5,818,659 A | * | 10/1998 | Cheung et al. .......... | 360/77.08 |
| 6,324,030 B1 | * | 11/2001 | Cheung et al. .......... | 360/77.08 |

\* cited by examiner

*Primary Examiner*—David Hudspeth
*Assistant Examiner*—Fred F. Tzeng
(74) *Attorney, Agent, or Firm*—Joan Pennington

(57) ABSTRACT

A method and apparatus are provided for improved position error signal (PES) demodulation in the presence of thermal baseline wander. A plurality of samples is obtained within each period of a burst signal for each servo burst in a servo sequence. A difference value is identified between a largest sample value and a smallest sample value of the plurality of samples within each period of the burst signal. The difference values for each period of the burst signal for each servo burst in the servo sequence are summed to produce a burst sum value for each servo burst. Then the burst sum values are used to identify a position error signal (PES) value. The identified PES value is independent of any transient baseline voltage offset disturbances, for example, resulting from the occurrence of baseline wander offset, such as caused by a thermal asperity (TA), in the servo sectors.

19 Claims, 8 Drawing Sheets

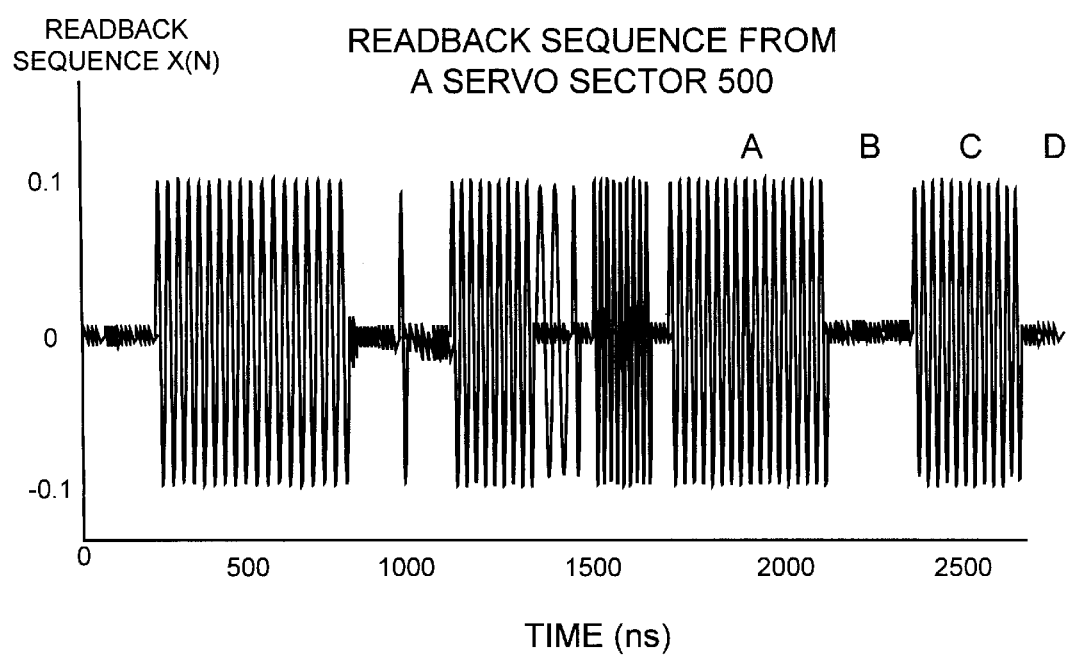

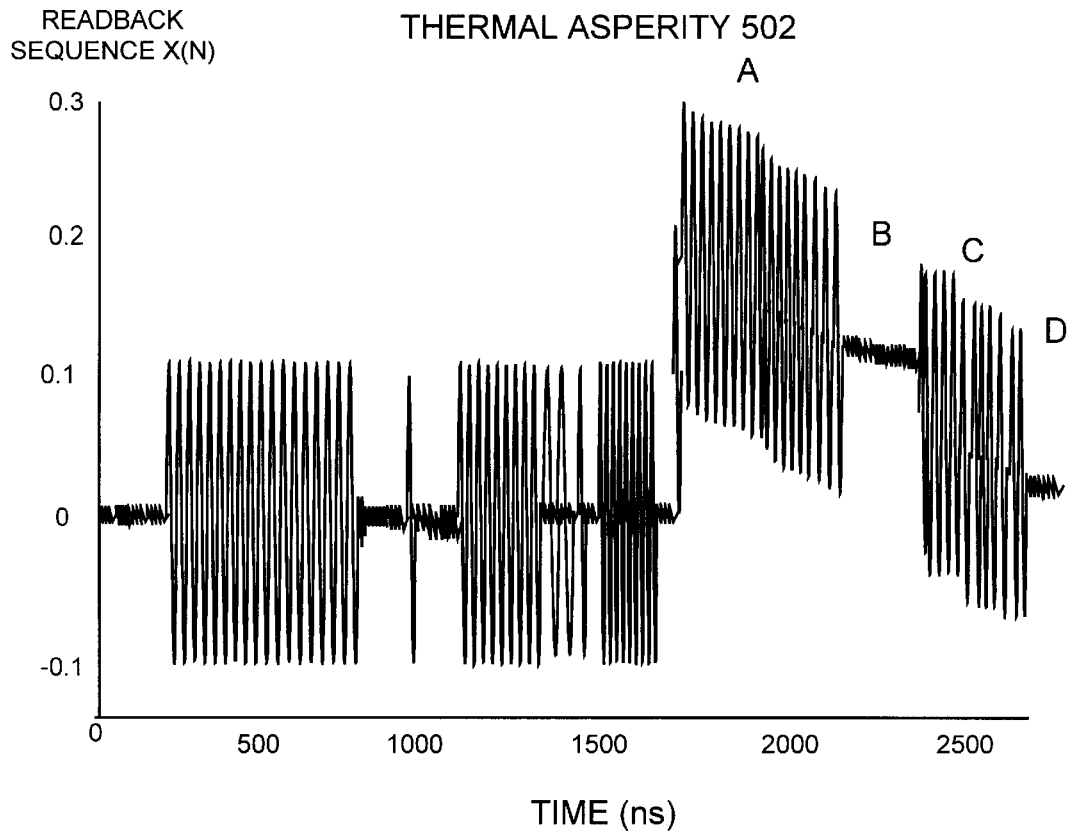

though the present invention is illustrated...

METHOD AND APPARATUS FOR IMPROVED PES DEMODULATION IN THE PRESENCE OF THERMAL ASPERITIES

FIELD OF THE INVENTION

The present invention relates generally to the data processing field, and more particularly, relates to a method and apparatus for improved position error signal (PES) demodulation in the presence of baseline wander offset in disk drives.

DESCRIPTION OF THE RELATED ART

Modern disk drives are becoming more sophisticated with lower flyheight, higher areal recording densities, and faster rotational spindle velocities. Many new high capacity hard disk drives (HDDs) are storing an increasingly large amount of data on the magnetically coated disk surfaces. The areal recording densities are exceeding 10 Megabits per square inch. This large areal recording density requires the recording heads to fly even closer to the disk surface. The reason for the lower flyheight is to obtain the necessary signal strength in the readback signal from the transducer MR-head to discern the recorded data-signal from noise. In other words, the signal-to-noise (S/N) ratio in the readback signal has to exceed a certain level for reliable reading and writing of the recorded signal.

Average flyheights of less than one microinch or 25 nanometers are common. The dynamic flyheight separation between the head transducer and the disk surface can be considered a random process with a mean value equal to the average flyheight and an erratic variance. Factors involved in the flyheight variation are topological disk surface variations, turbulence in the airflow making up the airbearing cushion underneath the slider, mechanical resonances in the actuator arm/suspension structure, and the like.

A functional MR head is biased by a current passing through the MR element. The MR bias current that is roughly 10 milliamperes is heating the MR head. The overall readback signal from a MR head consists of two components, the magnetic and the thermal. Research, by the present inventors, has identified any changes in the baseline of the readback signal from a MR head, as being caused by the thermal signal component. The low frequency thermal signal component is often called the baseline-wander. Any variations in the thermal signal component are caused by minute variations in the heat transfer between the MR head and the disk surface. The heat transfer varies with the physical separation between the heated MR head and the cooler disk surface. MR bias current that is roughly 10 milliamperes is heating the MR head. When the physical separation is reduced, as would be the case of a protruding defect passing underneath the MR head, the MR head will cool down slightly. If a surface pit slides by the MR head, the separation is increased and the MR head will heat up slightly. Due to the resistive temperature coefficient of the MR head, these minute cool-downs and warm-ups will change the voltage across the MR head. This change is the thermal baseline-wander.

Today most hard disk drives (HDD) have prerecorded sectors of servo information, written magnetically, on each of the disk surfaces. Typically the servo information is demodulated into a position error signal (PES) and used for radial positioning of the recording head. This information, for example, is written in 50–100 equally spaced sectors that are slightly off perpendicular to the concentric circular tracks. Around the track, the servo-sectors are interlaced with much larger data-sectors.

The occurrence of a thermal asperity (TA) in the servo sectors can result in large transient offsets in the readback signal, that is, the baseline wander changes rapidly. As used in the following specification and claims, the term thermal asperity (TA) should be understood to include media dropouts and other grown defects. Media dropouts and other grown defects in the servo sectors can result in incorrect position error signal (PES) demodulation, causing unacceptable track misregistration (TMR) problems in high performance disk drives.

A need exists for a method and apparatus for improved position error signal (PES) demodulation in the presence of thermal asperities.

SUMMARY OF THE INVENTION

A principal object of the present invention is to provide a method and apparatus for improved position error signal (PES) demodulation in the presence of thermal asperities. Other important objects of the present invention are to provide such method and apparatus for improved position error signal (PES) demodulation in the presence of thermal asperities substantially without negative effect and that overcome many of the disadvantages of prior art arrangements.

In brief, a method and apparatus are provided for improved position error signal (PES) demodulation in the presence of thermal asperities. A plurality of samples is obtained within each period of a burst signal for each servo burst in a servo sequence. A difference value is identified between a largest sample value and a smallest sample value of the plurality of samples within each period of the burst signal. The difference values for each period of the burst signal for each servo burst in the servo sequence are summed to produce a burst sum value for each servo burst. Then the burst sum values are used to identify a position error signal (PES) value.

In accordance with features of the invention, the identified PES value is independent of any transient baseline voltage offset disturbances, for example, resulting from the occurrence of a thermal asperity (TA) in the servo sectors.

BRIEF DESCRIPTION OF THE DRAWINGS

The present invention together with the above and other objects and advantages may best be understood from the following detailed description of the preferred embodiments of the invention illustrated in the drawings, wherein:

FIGS. 5A and 5B are diagrams respectively illustrating a typical prior art readback signal from a servo sector and a prior art readback signal from a servo sector including a thermal asperity (TA) event.

DETAILED DESCRIPTION OF THE PREFERRED EMBODIMENTS

Figure 1:
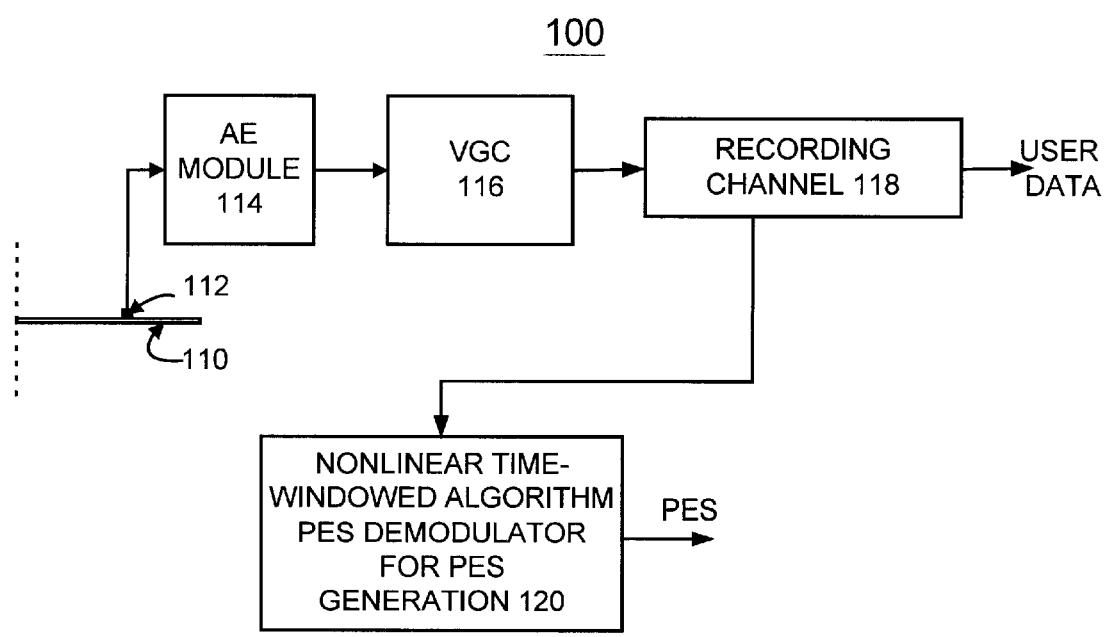
FIG. 1 is a block diagram representation illustrating a data channel for implementing methods for improved position error signal (PES) demodulation in the presence of thermal asperities in accordance with the preferred embodiment.

Having reference now to the drawings, in FIG. 1, there is shown a direct access storage device (DASD) or disk drive generally designated by 100 for implementing methods for identifying a position error signal (PES) in accordance with the preferred embodiment. As shown in FIG. 1, DASD 100 includes a recorded disk 110 that is spun at constant speed and a recording head 112 that is positioned on a given track for reading information stored on that track. The readback signal is highpass-filtered by an arm electronic (AE) module 114 and applied to a variable gain amplifier (VGA) 116. A recording channel 118 coupled to the VGA 116 provides user data at it output. The recording channel 118 is coupled to a nonlinear time-windowed algorithm position error signal (PES) demodulator 120 for PES generation in accordance with the preferred embodiment. The PES demodulator 120 performs a nonlinear time-windowed algorithm for improved PES generation of the preferred embodiment as illustrated and described with respect to FIGS. 4A and 4B.

Figure 2:
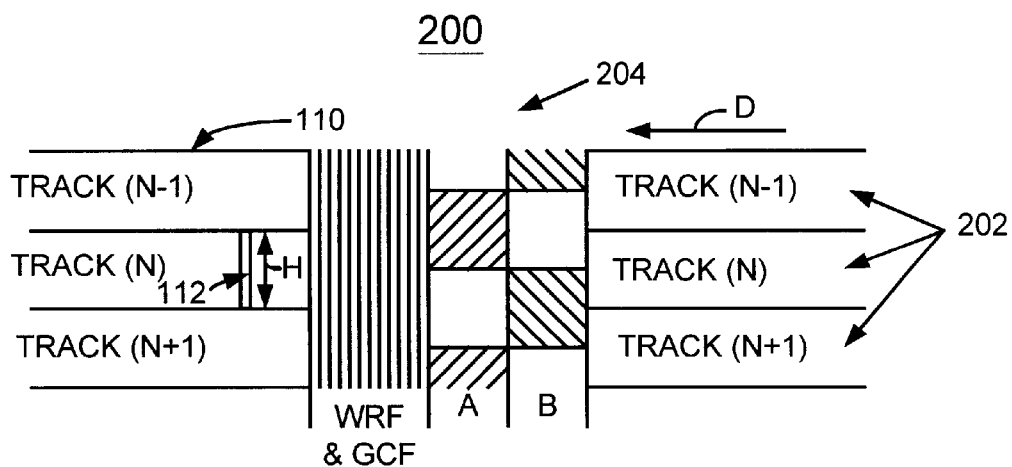
FIG. 2 is a diagram illustrating a prior art servo sector format with three tracks.

FIG. 2 illustrates a very simplified prior art diagrammatic formatting of one radial servo sector with three tracks, N−1, N, N+1, generally designated by the reference character 200. Referring to FIG. 2, the footprint of the recording MR-head 112 is shown to the left on track (N). The footprint shows that the MR-head 112 is perfectly positioned on the track N as indicated by an arrow labeled H. The MR-head 112 is stationary, while the disk surface 110 with the prewritten information is moving to the left, as indicated by an arrow labeled D. The vertically striped region in FIG. 2 consists of two fields, a write-recovery-field (WRF) and a Gray code field (GCF). In FIG. 2, only two servo pattern fields, the A-field and the B-field, are shown. Typically the vertically striped WRF and GCF region is roughly twice as wide as the crosshatched AB region that consists of the servo pattern fields. Note that both the A-field and the B-field are offset one-half track-pitch and writing in the A-field and B-field is alternately skipped in the radial (vertical) direction. Writing is only done in the crosshatched areas. Each of the crosshatched areas consists usually of several cycles P of a single high-frequency pattern. The readback signal from the MR-head 112 as the crosshatched pattern moves underneath the head will appear as a sinusoidal-like burst signal. Today, most high performance disk drives use four servo pattern fields (A, B, C, D). The (A, B)-field is used for purposes of simplicity in the understanding of position error signal (PES) generation. Typically, the MR head 112 is slightly narrower than the track width.

Assume that the recording head has a uniform read-sensitivity along the MR-element and that it is positioned as shown in FIG. 2. Then as the A-field followed by B-field pass underneath the head 112, two distinct sinusoidal-type signal-bursts, A(t) and B(t), are present in the MR-head readback signal x(t). Here continuous time is designated by the variable t. The bursts are separated in time, but have the same amplitude.

Figure 3A:
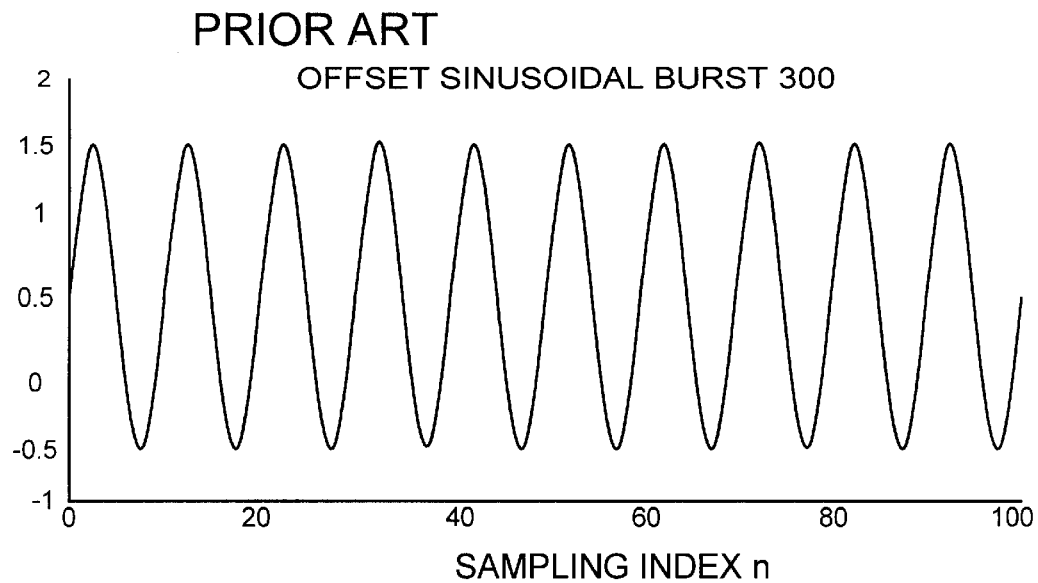
FIGS. 3A, 3B and 3C are diagrams respectively illustrating a prior art normalized sinusoidal burst offset; a prior art rectified version of the normalized sinusoidal burst offset; and a prior art position error signal (PES) as a function of a normalized baseline voltage offset.
Figure 3B:
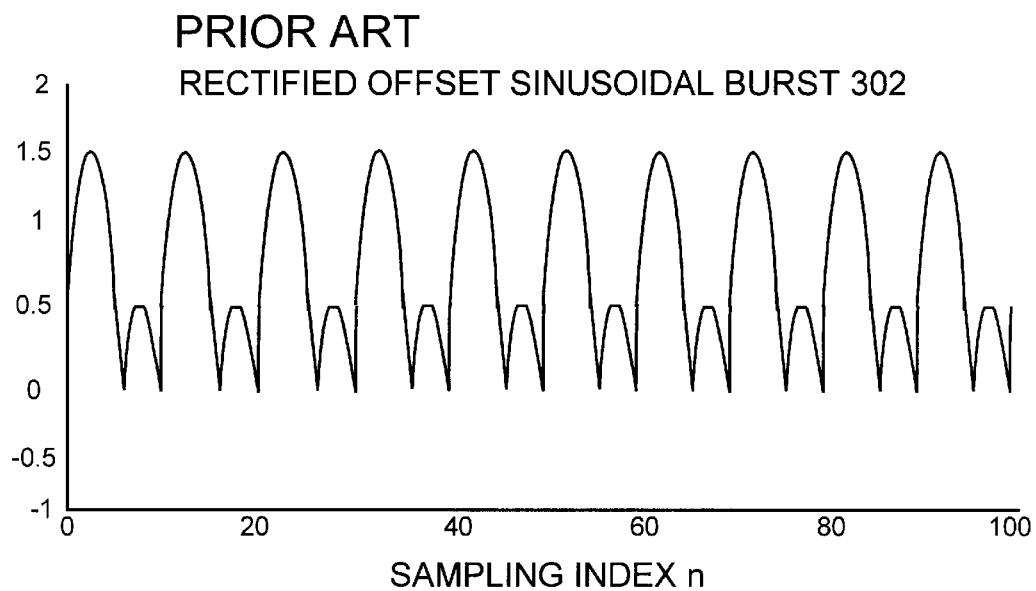

Referring also to FIG. 3A, for example, one such burst signal with an offset voltage generally designated 300 is shown. The readback signal is sampled to produce x(n), where n is the sampling index. In FIG. 3B, the rectified sinusoidal-type burst signal with an offset voltage generally designated 302 is shown. Within appropriate timing-windows, the sampled burst-signals A(n) and B(n) are extracted from x(n). The burst-signals samples with offset voltages are rectified and summed to produce Za and Zb according to the following Equation (1):

$$Za = \text{sum}(|A(n)|), \quad Zb = \text{sum}(|B(n)|). \qquad (1)$$

In FIG. 3B, the rectified sinusoidal-like burst signal 302 is shown. Conventionally, the position error signal (PES) is then generated by the following normalizing algorithm Equation (2):

$$PES = (Za - Zb)/(Za + Zb). \qquad (2)$$

It is well known that the burst-signal amplitude is proportional to amount of the A-field or B-field being covered by the footprint of the MR-head. Thus, it can easily be seen that the head position shown in FIG. 2 will result in $Za = Zb = Z^*$, where $Z^*$ is a reference value. Applying Equation (2) will give PES=0. Assume that the head footprint in FIG. 2 is shifted upwards by ¼ track-pitch. This would imply that there is 50% more of the A-field area being exposed to the MR-head and 50% less of the B-field area. As a result we obtain $Za = 1.5 \, Z^*$ and $Zb = 0.5 \, Z^*$. Again using Equation (2), will yield PES=+0.5. Similarly, it can be seen from FIG. 2, that a ¼ track-pitch motion downward would result in PES=−0.5.

A baseline modulation in the readback signal x(n) can be caused by the thermal heating and/or cooling of the MR-element. A program was written in MATLAB™ to simulate the effects of the baseline modulation on the position error signal (PES) generation. The baseline modulation produces transient voltage offsets in the readback signal x(n). The positioning of the MR-head is such that the correct PES=+0.5.

Figure 3C:
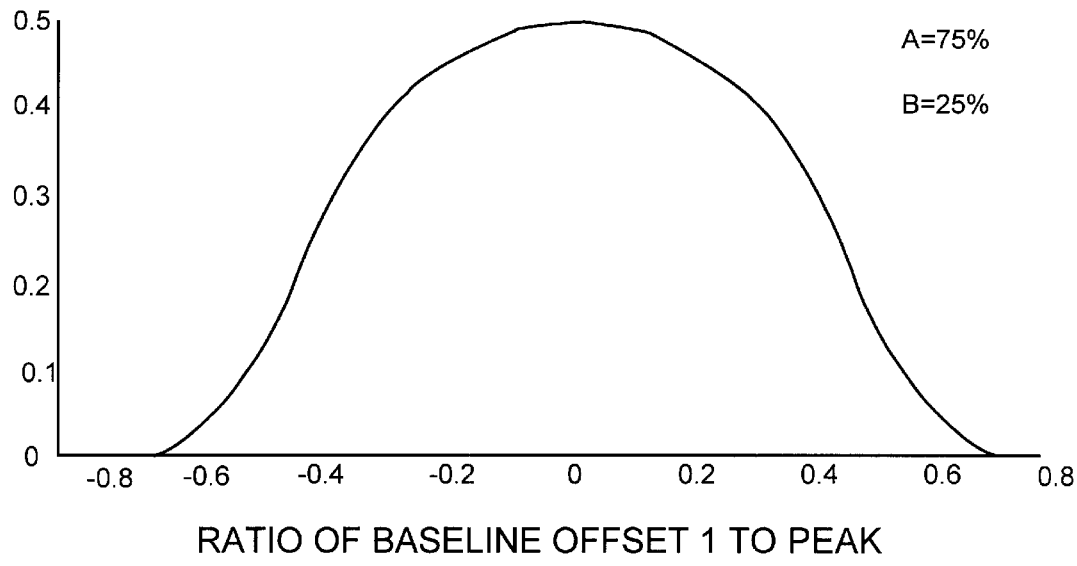

Referring to FIG. 3C, there is shown a simulation of the effects of voltage offsets on the PES demodulation for the MR head covering 75% of the A-field and 25% of the B-field. Specifically, FIG. 3C illustrates the results of the simulation of prior art PES versus baseline-voltage offset q/Vp. Note that the voltage offset in the voltage readback signal caused by thermal heating and/or cooling of the MR-head, and not by a physical head-position offset from the track centerline.

FIG. 3C shows that the prior art PES is increasingly sensitive to baseline-voltage offsets. The prior art PES decreases in absolute value for increasing absolute values of baseline-voltage offsets. This is an unacceptable condition for high-performance disk drives. It will cause track misregistration (TMR) problems in the disk drive, both the write-to-read TMR (WRTMR) and the write-to-write TMR (WWTMR). So decreasing the flyheight of the recording head causes an increase in the TMR due to thermal baseline wander, which prevents any increase in the track density of the disk drive. This would not have been a problem with an earlier prior art thin-film (TF) head of the type that the read/write TF-element is insensitive to thermal heating.

In accordance with features of the preferred embodiment, a novel method and apparatus are virtually insensitive to the transient baseline-voltage offsets for PES generation. The highly transient thermal heating/cooling of the MR-element of recording head 112 causes a transitory common-mode voltage signal produced by the bias current and the transitory resistive change of the MR-element. An elegant digital solution to the PES generation problem in the presence of transient baseline-voltage offsets from thermal asperities (TAs) is to use a nonlinear time-windowed algorithm of the preferred embodiment.

Assuming that the periodic frequency of the sinusoidal-type burst-signal is fw and the higher sampling rate is fs, then the number of samples M within one period of the sinusoidal-type burst-signal becomes M=fs/fw. Furthermore, assume that the sinusoidal-type burst-signal has P complete periods within the burst. For a realistic numeric example, let fs=500 MHz, fw=50 MHz, (M=10), P=10. In this case, there would be P*M=100 readback signal samples across the signal burst. The time duration of one of the bursts would be P*M/fs=200 nanoseconds. This burst-duration is remarkably short and, thus, requires a very high bandwidth system to perform any corrective actions.

In accordance with features of the preferred embodiment, a difference D(j) between the largest and smallest (high-low) sample value within one period of the sinusoidal-type burst-signal, i.e., a timing-window of M samples, is computed and stored. The difference D(j) is the peak-to-peak value of the burst signal within the timing-window of M samples. This process is repeated over the P periods within the duration of the burst-signal. The differences D(j) are summed to produce Si for each of the burst-sequences, that is the peak-to-peak burst sums, Sa and Sb. Then the corresponding PES signal is found by application of the following modified PES demodulator algorithm in Equation (3), (where Za is replaced by the peak-to-peak burst-sum Sa and Zb is replaced by the peak-to-peak burst-sum Sb as compared to above equation (2)) as follows.

$$PES=(Sa-Sb)/(Sa+Sb). \qquad (3)$$

Thus, the improved PES value of the preferred embodiment for the servo sector is provided. The nonlinear time-windowed algorithm for PES generation of the preferred embodiment is independent of any transient baseline-voltage offset disturbances.

Figure 4A:
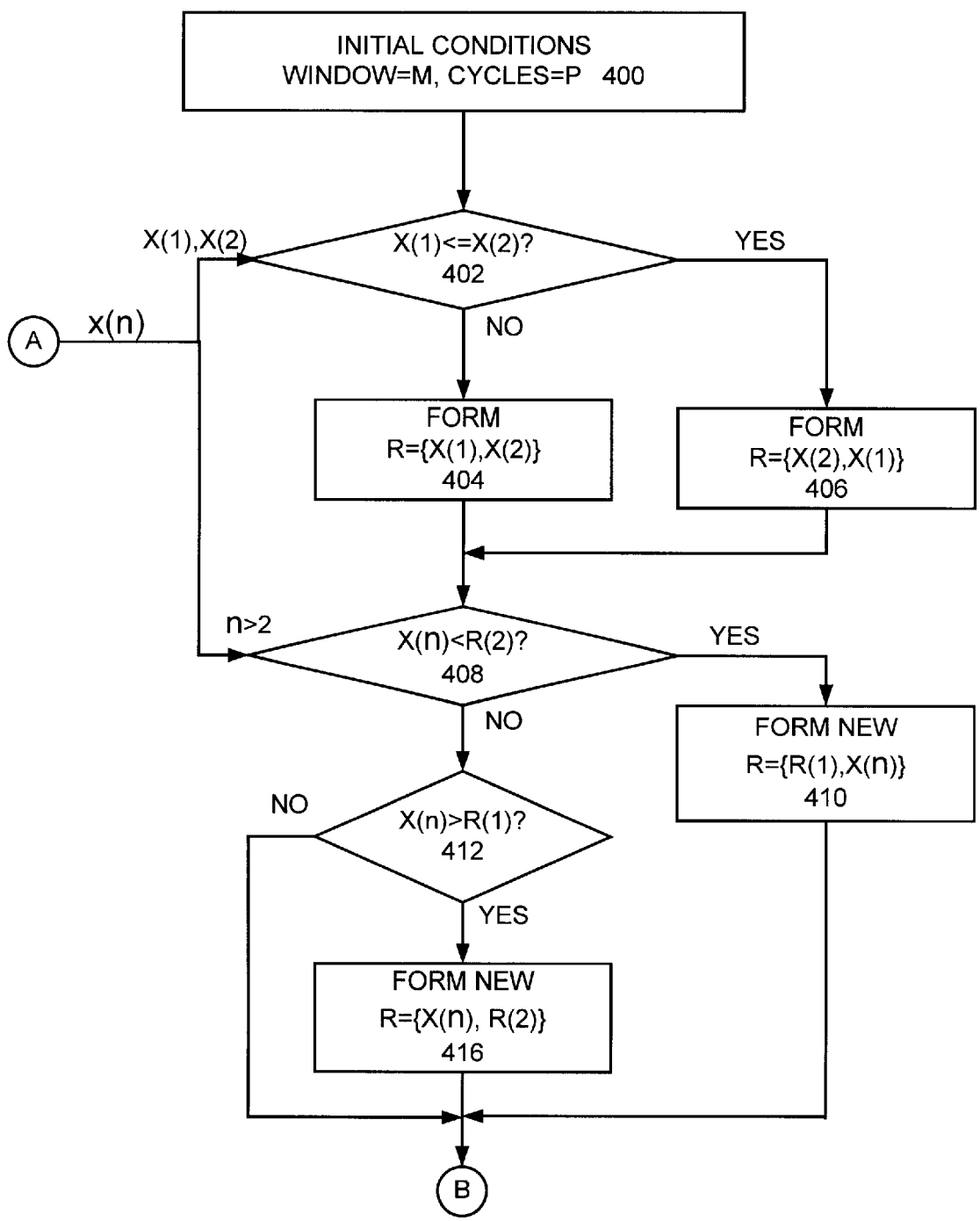
FIGS. 4A and 4B are flow charts illustrating exemplary sequential steps of the nonlinear time-windowed algorithm position error signal (PES) demodulator of FIG. 1 for improved position error signal (PES) demodulation in the presence of thermal asperities in accordance with the preferred embodiment.
Figure 4B:
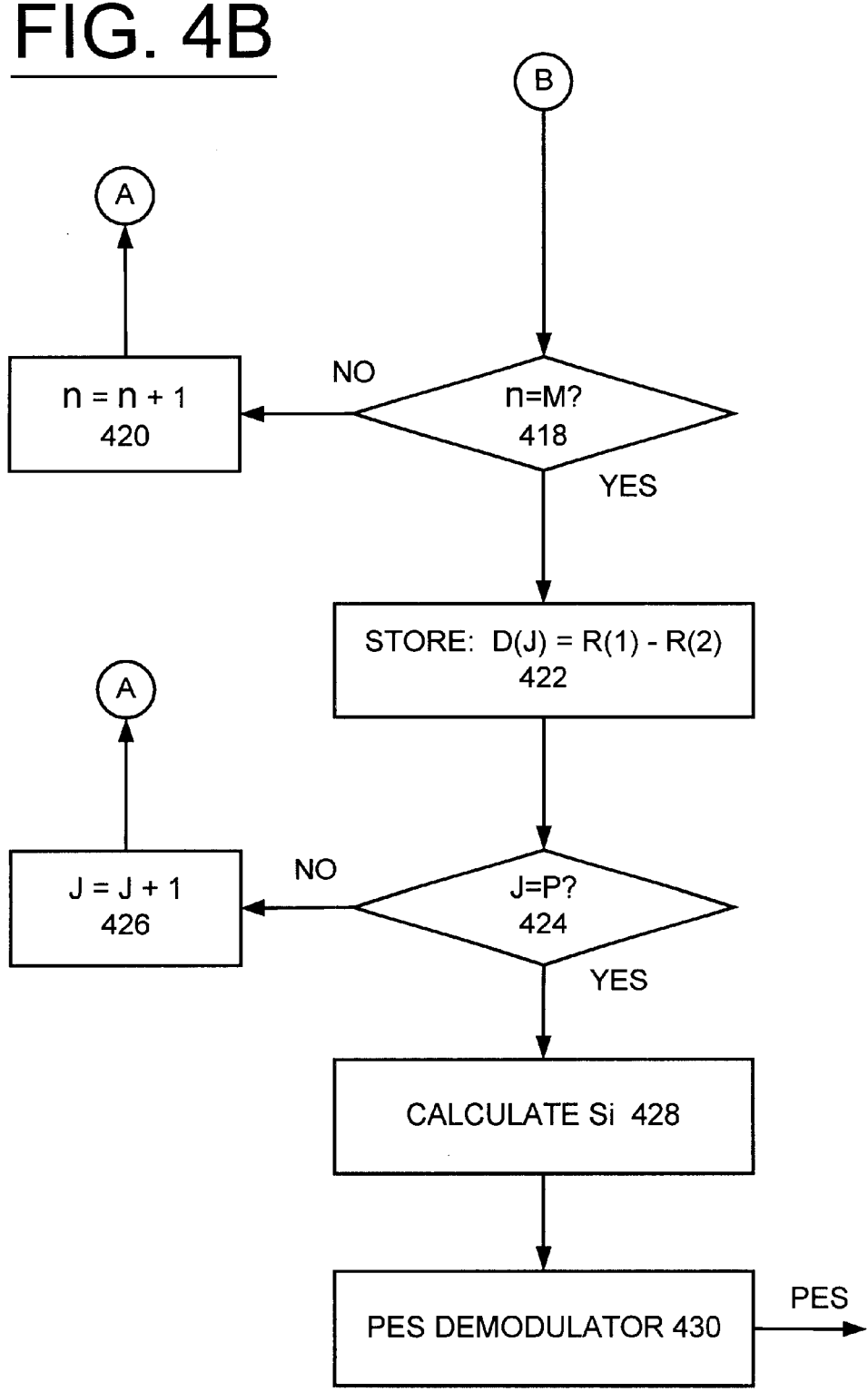

In accordance with features of the preferred embodiment, the PES demodulator 120 of the preferred embodiment illustrated in FIGS. 4A and 4B is all-digital implementation. PES demodulator 120 of the preferred embodiment can be implemented as a microcode feature or a hardware feature of a single powerful digital signal processor (DSP) controlling the entire disk drive. For other HDD applications, PES demodulator 120 of the preferred embodiment can be used in the error recovery procedure (ERP) to properly decode the PES values that otherwise would have been marred by baseline voltage modulations of various forms.

Referring now to FIGS. 4A and 4B, there are shown exemplary sequential steps performed by the nonlinear time-windowed algorithm position error signal (PES) demodulator 120 of FIG. 1 for improved position error signal (PES) demodulation in the presence of baseline wander in accordance with the preferred embodiment. The nonlinear time-windowed algorithm is applied to each of servo burst-sequences (A, B) or (A, B, C, D). Initial conditions for window M and cycles P are obtained as indicated in a block 400. Samples X(1), X(2) of the readback signal X(n) are compared as indicated in a block 402. If X(1) is not less than X(2), the R is set to {X(1), X(2)} as indicated in a block 404. If X(1) is less than X(2), the R is set to {X(1), X(2)} as indicated in a block 406. For n greater than 2, (n>2), X(n) is compared with R(2) as indicated in a decision block 408. If X(n) is less than R(2), then a new R={R(1), X(n)} is formed as indicated in a block 410 and is passed on to B. If X(n) is greater than or equal to R(2), then X(n) is compared with R(1) as indicated in a decision block 412. If X(n) is not greater than R(1), then the original R is passed on to B. If X(n) is greater than R(1), then a new R={X(n), R(2)} is formed as indicated in a block 416 and is passed on to B. Then the sampling index n is compared with window M as indicated in a decision block 418. If n does not equal M, then n is incremented by one and next sample values are processed as indicated in a block 420. When n equals M, then the difference D(J) between the largest and smallest sample value within one period of the sinusoidal-type burst signal, that is timing window of M samples or D(J)=R(1)−R(2) is stored as indicated in a block 422. This difference D(J) is the peak-to-peak value of the burst signal within the timing-window of M samples. Next J is compared with P periods as indicated in a decision block 424. If J does not equal P, then J is incremented by one and next sample values are processed as indicated in a block 426. This process is repeated over the P periods within the duration of the burst-signal. When J equals P then the differences D(J) are summed to produce Si for each of the burst-sequences, that is the peak-to-peak burst sums, Sa and Sb, as indicated in a block 428. The calculation of Si is represented by:

$$Si = \sum_{J=1}^{P} D(J), i = a, b, c, d \qquad (4)$$

Finally the corresponding PES signal is found by application of the PES demodulator Equation (3) as indicated in a block 430.

Referring to in FIG. 5A, to simulate the power of non-linear time-windowed algorithm position error signal (PES) demodulator 120 for PES generation in accordance with the preferred embodiment, a typical readback sequence x(n) 500 from the inner diameter (ID) of a modern disk drive is shown. Readback sequence x(n) includes (A, B, C, D) servo fields are read by the MR-head of recording head 112. The sampling rate is fs=1.0 GHz and the frequency within the servo-burst fields about fw=47.6 MHz. This yields M=fs/fw=21 samples per cycle and there are P=12 cycles per servo-burst. In readback sequence x(n) 500, there is no significant baseline-voltage modulation present in this readback signal. Roughly, the burst in the region 250–850 nanosecond is the write-recovery-field (WRF), the region 1250–1750 nanosecond is the Gray code field (GCF), and the A, B, C, D servo bursts start at about 1900 nanosecond. Each servo-burst duration is about 250 nanoseconds. Referring to Equation (3), the normalizing PES demodulator equation of the preferred embodiment calculated at block 430 of FIG. 4B for the four servo bursts is:

$$PES=(Sa-Sb+Sc-Sd)/(Sa+Sb+Sc+Sd) \qquad (6)$$

where Sa, Sb, Sc, and Sd are calculated at block 428 of FIG. 4B as defined in equation (4).

Referring also to in FIG. 5B, a readback sequence x(n) 502 from the inner diameter (ID) of a modern disk drive including a thermal asperity (TA) event is shown. Assume no significant baseline-voltage modulation present in this readback signal x(n) as shown in FIG. 5A. Then, it is very easy to simulate a baseline-voltage modulation b(n) in the readback signal x(n) by adding baseline-voltage modulation b(n) to x(n) such that the baseline-modulated signal y(n)=x(n)+b(n). This was done in FIG. 5B, where a thermal asperity (TA) event of initial magnitude of 0.2 volt and occurring at about 1800 nanosecond with a 500 nanosecond time constant was added to the sequence 500 shown in FIG. 5A.

TABLE 1 illustrates the dramatic improvement in PES demodulation using the invention. TABLE 1 compares PES values using the conventional sum-of-rectified-burst method with the sum-of-peak-to-peak-bursts method implemented by the nonlinear time-windowed algorithm position error signal (PES) demodulator 120 for PES generation in accordance with the preferred embodiment. Referring to TABLE 1 below, the first row gives the PES values when the two methods applied to the sequence 500 in FIG. 5A, the second row shows the PES values when applied to the sequence 502 in FIG. 5B. The last row is a simple offset of 0.05 volts applied to the sequence 500 in FIG. 5A. A simple baseline-voltage offset across the ABCD-fields could be generated by a 40-micron surface pit of uniform depth at the outer diameter of a disk spinning at 10,000 RPM.

TABLE 1

Position Error Signal (PES) Value

| Baseline Voltage Disturbance | Conventional Method | Nonlinear time-windowed algorithm PES demodulator 120 |
|---|---|---|
| None | 0.521 | 0.510 |
| TA 0.2 v, 500 nsec. | 0.271 | 0.507 |
| Constant offset 0.05 v | 0.079 | 0.510 |

TABLE 1 shows the superiority of the method of the preferred embodiment shown in FIGS. 4A and 4B. The robustness of the sum-of-peak-to-peak bursts method of nonlinear time-windowed algorithm position error signal (PES) demodulator 120 for PES generation in accordance with the preferred embodiment to any baseline-voltage modulation is clearly evident by comparing the consistency of the PES values provided in the last column of TABLE 1. The results using the conventional HDD-industry method for generating the position error signal (PES) are given in the middle column of Table 1. Note that the TA produces ¼-track pitch in the position error signal (PES), while the 0.05 volt offset causes about a 40% of one track-pitch error in the PES using the conventional HDD-industry method. It is interesting to observe here that the constant offset baseline voltage is more detrimental to the error in the PES value than the exponentially decaying TA using the conventional HDD-industry method.

In operation the real-time PES demodulator 120 of the preferred embodiment illustrated in FIGS. 4A and 4B, assumes that timing-window of M samples is incrementally shifted by M samples for each period of the sinusoidal-type burst-signal, that is, there is no overlap between adjacent window positions. The window could be a sliding window with various degrees of overlap that would result in more averaging of combinations of peak-to-peak values resulting a better estimation of the PES. However, any amount of window-overlap will cause additional processing time making it more expensive to make it a real-time PES demodulator 120 of the preferred embodiment.

PES demodulator 120 of the preferred embodiment overcomes the sensitivity of the PES demodulation to any baseline-voltage variations in the readback signal x(n). PES demodulator 120 of the preferred embodiment does not require any different servo formatting of the disk surfaces nor does it demand any change to the servo PES demodulation timing control. The net result of the improved PES demodulation accuracy in the presence of thermal asperities and surface defects is that the track density can be increased without causing unacceptable track misregistration (TMR) problems in high performance disk drives.

While the present invention has been described with reference to the details of the embodiments of the invention shown in the drawing, these details are not intended to limit the scope of the invention as claimed in the appended claims.

What is claimed is:

1. A method for improved position error signal (PES) demodulation in the presence of baseline wander in a hard disk drive comprising the steps of:

obtaining a plurality of samples within each period J of a burst signal for each servo burst in a servo sequence;

computing and storing a difference value between a largest sample value and a smallest sample value of said plurality of samples within each said period J of said burst signal; said difference value represented by D(J);

summing said difference values D(J) for each said period of said burst signal for each said servo burst in said servo sequence to produce peak to peak burst sum values Si represented by:

$$Si = \sum_{J=1}^{P} D(J), i = a, b, c, d$$

where P represents an integral number of said periods J within each said servo burst in said servo sequence and A, B, C, D are sequential servo bursts;

using said peak to peak burst sum values Si to identify the position error signal (PES).

2. A method for improved position error signal (PES) demodulation as recited in claim 1 wherein the step of obtaining said plurality of samples within each said period J of a burst signal for each said servo burst in said servo sequence includes the step of sampling said burst signal at a predefined sampling rate fs, said predefined sampling rate fs being substantially greater than a periodic frequency of said burst signal.

3. A method for improved position error signal (PES) demodulation as recited in claim 2 wherein the step of sampling said burst signal at said predefined sampling rate fs provides said plurality of samples represented by M=(fs/fw) within each said period J of said burst signal, where fw represents a periodic frequency of said burst signal.

4. A method for improved position error signal (PES) demodulation as recited in claim 3 wherein the step of computing and storing said difference value between said largest sample value and said smallest sample value of said plurality of samples within each said period J of said burst signal includes the steps of computing and storing said difference value D(J) of said plurality of samples M, for sequential periods J of said burst signal for each said servo burst in said servo sequence.

5. A method for improved position error signal (PES) demodulation as recited in claim 4 wherein said predefined sampling rate fs equals 1.0 GHz and fw is approximately 47.6.

6. A method for improved position error signal (PES) demodulation as recited in claim 1 wherein said servo sequence includes two sequential said servo bursts A, B and wherein the step of using said burst sum values to identify said position error signal (PES) value includes the step of calculating said position error signal (PES) value represented by:

$$PES=(Sa-Sb)/(Sa+Sb).$$

7. A method for improved position error signal (PES) demodulation as recited in claim 1 wherein said servo sequence includes four sequential said servo bursts A, B, C, D and wherein the step of using said burst sum values to identify said position error signal (PES) value includes the step of calculating said position error signal (PES) value represented by:

$$PES=(Sa-Sb+Sc-Sd)/(Sa+Sb+Sc+Sd).$$

8. Apparatus for improved position error signal (PES) demodulation in the presence of baseline wander in a hard disk drive comprising:
   a PES demodulator for performing a nonlinear time-windowed algorithm for generating a PES value; said nonlinear time-windowed algorithm for generating a PES value performed by said PES demodulator including the steps of:
   obtaining a plurality of samples within each period J of a burst signal for each servo burst in a servo sequence;
   computing and storing a difference value between a largest sample value and a smallest sample value of said plurality of samples within each said period J of said burst signal; said difference value represented by D(J);
   summing said difference values D(J) for each said period of said burst signal for each said servo burst in said servo sequence to produce peak to peak burst sum values Si represented by:

$$Si = \sum_{J=1}^{P} D(J), i = a, b, c, d$$

where P represents an integral number of said periods J within each said servo burst in said servo sequence and A, B, C, D are sequential servo bursts; and
   using said peak to peak burst sum values Si to identify said position error signal (PES) value.

9. Apparatus for improved position error signal (PES) demodulation as recited in claim 8 wherein said PES demodulator includes a digital hardware implementation in the hard disk drive.

10. Apparatus for improved position error signal (PES) demodulation as recited in claim 8 wherein said PES demodulator includes a processor in the hard disk drive.

11. Apparatus for improved position error signal (PES) demodulation as recited in claim 10 wherein said PES demodulator processor is a digital signal processor.

12. Apparatus for improved position error signal (PES) demodulation as recited in claim 8 wherein said servo sequence includes two sequential servo bursts A, B and wherein the step of using said burst sum values to identify said position error signal (PES) value includes the step of calculating said position error signal (PES) value represented by:

$$PES=(Sa-Sb)/(Sa+Sb),$$

where Sa, Sb, represent said burst sum values for said two sequential said servo bursts A, B.

13. Apparatus for improved position error signal (PES) demodulation as recited in claim 8 wherein said servo sequence includes four sequential servo bursts A, B, C, D and wherein the step of using said burst sum values to identify said position error signal (PES) value includes the step of calculating said position error signal (PES) value represented by:

$$PES=(Sa-Sb+Sc-Sd)/(Sa+Sb+Sc+Sd),$$

where Sa, Sb, Sc, Sd, represent said burst sum values for said four sequential said servo bursts A, B, C, D.

14. Apparatus for improved position error signal (PES) demodulation as recited in claim 8 wherein the step of obtaining said plurality of samples within each said period J of a burst signal for each said servo burst in said servo sequence includes the step of sampling said burst signal at a predefined sampling rate fs.

15. Apparatus for improved position error signal (PES) demodulation as recited in claim 14 wherein the step of sampling said burst signal at said predefined sampling rate fs provides said plurality of samples represented by M=(fs/fw) within each said period J of said burst signal, where fw represents a periodic frequency of said burst signal.

16. Apparatus for improved position error signal (PES) demodulation as recited in claim 14 wherein said predefined sampling rate fs is substantially greater than said periodic frequency fw of said burst signal.

17. A method for improved position error signal (PES) demodulation in the presence of baseline wander in a hard disk drive comprising the steps of:
   obtaining a plurality of samples within each period of a burst signal for each servo burst in a servo sequence;
   identifying a difference value represented by D(J) between a largest sample value and a smallest sample value of said plurality of samples within each said period J of said burst signal;
   summing said difference values D(J) for each said period of said burst signal for each said servo burst in said servo sequence to produce peak to peak burst sum values Si represented by:

$$Si = \sum_{J=1}^{P} D(J), i = a, b, c, d$$

where P represents an integral number of said periods J within each said servo burst in said servo sequence and A, B, C, D are sequential servo bursts;
   using said peak to peak burst sum values Si to identify a position error signal (PES) value.

18. A method for improved position error signal (PES) demodulation as recited in claim 17 wherein said servo sequence includes two sequential servo bursts A, B and wherein the step of using said peak to peak burst sum values to identify said position error signal (PES) value includes the step of calculating said position error signal (PES) value represented by:

$$PES=(Sa-Sb)/(Sa+Sb),$$

where Sa, Sb, represent said burst sum values for said two sequential said servo bursts A, B.

19. A method for improved position error signal (PES) demodulation as recited in claim 17 wherein said servo sequence includes four sequential servo bursts A, B, C, D and wherein the step of using said peak to peak burst sum values to identify said position error signal (PES) value includes the step of calculating said position error signal (PES) value represented by:

$$PES=(Sa-Sb+Sc-Sd)/(Sa+Sb+Sc+Sd),$$

where Sa, Sb, Sc, Sd, represent said burst sum values for said four sequential said servo bursts A, B, C, D.

* * * * *